United States Patent
Keefe et al.

(10) Patent No.: US 12,166,918 B2
(45) Date of Patent: Dec. 10, 2024

(54) SCAM COMMUNICATION ENGAGEMENT

(71) Applicant: Lenovo (Singapore) Pte. Ltd., Singapore (SG)

(72) Inventors: Christina Keefe, Cheektowaga, NY (US); Lindsay Nelson, Highlands Ranch, CO (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 160 days.

(21) Appl. No.: 17/743,054

(22) Filed: May 12, 2022

(65) Prior Publication Data

US 2023/0370543 A1    Nov. 16, 2023

(51) Int. Cl.
*H04M 3/00* (2024.01)
*G06F 40/40* (2020.01)
*H04M 3/22* (2006.01)
*H04M 3/42* (2006.01)
*H04M 3/436* (2006.01)
*H04M 3/54* (2006.01)

(52) U.S. Cl.
CPC .......... *H04M 3/2281* (2013.01); *G06F 40/40* (2020.01); *H04M 3/42059* (2013.01); *H04M 3/436* (2013.01); *H04M 3/543* (2013.01); *H04M 2203/6027* (2013.01)

(58) Field of Classification Search
CPC .... H04M 3/2281; H04M 3/436; H04M 3/543; H04M 2203/6027; G06F 40/40

USPC ........................ 379/202.01, 265.01–265.14, 379/266.01–266.1, 309
See application file for complete search history.

(56) References Cited

U.S. PATENT DOCUMENTS

| | | | |
|---|---|---|---|
| 7,933,387 B1* | 4/2011 | Baker, IV | H04M 1/642 |
| | | | 379/265.09 |
| 9,071,683 B1* | 6/2015 | Somes | H04M 3/42059 |
| 9,350,858 B1* | 5/2016 | Roths | H04M 3/4365 |
| 10,110,741 B1* | 10/2018 | Cohen | H04M 3/436 |
| 10,455,085 B1* | 10/2019 | Roundy | H04W 12/12 |
| 10,810,510 B2* | 10/2020 | Baracaldo Angel | G06N 20/00 |
| 10,958,779 B1* | 3/2021 | Rule | H04M 3/54 |
| 11,463,582 B1* | 10/2022 | Serban | G06N 20/00 |
| 2016/0247165 A1* | 8/2016 | Ryabchun | G06Q 30/0201 |
| 2019/0020759 A1* | 1/2019 | Kuang | H04W 12/00 |
| 2019/0166069 A1* | 5/2019 | Yao | G06N 20/00 |
| 2020/0034743 A1* | 1/2020 | Baracaldo Angel | |
| | | | G10L 15/1822 |
| 2022/0284171 A1* | 9/2022 | Laxman | G06F 40/35 |

* cited by examiner

*Primary Examiner* — William J Deane, Jr.
(74) *Attorney, Agent, or Firm* — FERENCE & ASSOCIATES LLC (57) ABSTRACT

One embodiment provides a method, the method including: receiving, at an information handling device, an active communication; determining, using a scam detection system, the active communication is received from a scamming entity; transferring, using the scam detection system, the active communication to an automated conversation agent; and interacting, using the automated conversation agent, with the scamming entity.

18 Claims, 5 Drawing Sheets

SCAM COMMUNICATION ENGAGEMENT

BACKGROUND

The collection and sale of user data has become a common business practice as the use and reliance on technology has become more prevalent in society. Collection of user data is performed each time a user accesses a public domain. For example, a user accessing a website may have their user data collected by a business once the user has typed in a URL for the website and/or when a user is directed to a website via search engine. The collection of such user data will then be sold off by the business which collected the data to a company that will then use the collected user data to market directly to a user. Personal information regarding a user collected may include, for example, a person's phone number, a profile of interests, location information. Of the information collected and sold, the phone number of a person may be purchased and utilized by a company attempting to scam a user.

BRIEF SUMMARY

In summary, one aspect provides a method, the method including: receiving, at an information handling device, an active communication; determining, using a scam detection system, the active communication is received from a scamming entity; transferring, using the scam detection system, the active communication to an automated conversation agent; and interacting, using the automated conversation agent, with the scamming entity Another aspect provides an information handling device, the information handling device including: receive, at an information handling device, an active communication; determine, using a scam detection system, the active communication is received from a scamming entity; transfer, using the scam detection system, the active communication to an automated conversation agent; and interact, using the automated conversation agent, with the scamming entity A further aspect provides a product, the product including: a computer-readable storage device that stores executable code that, when executed by a processor, causes the product to: receive, at an information handling device, an active communication; determine, using a scam detection system, the active communication is received from a scamming entity; transfer, using the detection system, the active communication to an automated conversation agent; and interact, using the automated conversation agent, with the scamming entity.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Attempting to scam a person by phone number is commonly performed by receiving an excessive number of phone calls from the scammer. A scammer may utilize an overbearing tactic that will regularly call a person under a false identification in an attempt to convince the person that there is either an issue with an aspect of the person's life and/or the person being called is being awarded a reward of some type. If the person receiving the call then follows the instruction and inputs the information being requested by the scammer on the phone call, the person will then have more of their personal data compromised and possibly money or other valuables taken. This compromising of data can be much more severe than the collection of personal data from accessing a public domain.

It is upon the person receiving the call the determine the legitimacy of the call. It is common for a scammer or scamming company to utilize a bot to make phone calls. A bot is a written program that may perform calls at a faster pace than human call centers, and does not require a paycheck (since it is software and not a human). In most cases, the recognition of a bot on the other end of phone call may be identified when hearing the sound of the voice being provided by the bot. The voice will sound choppy and unnatural by having a broken cadence and even containing an artificial/robotic tone. In other cases, a human inquiring about a topic and thereafter requesting information may be providing the phone call to a person. In this situation, a person must be particularly careful for the recognition of a bot is typically a giveaway of a scammer, but the presence of a human attempting to scam a person may be more convincing.

A person may receive a plurality of calls each day causing disruptions for the person. Whether work, personal, or recreationally busy, the ringing of one's device as a response to the receipt of an incoming phone call will draw the attention of the person, thus interrupting a task being performed. With this occurring multiple times a day, a person may be highly distracted. What is needed is a system that may recognize a call being received at a person's device as being provided by a scammer, and may additionally reduce the amount of calls in which a scammer can make in a day.

Accordingly, the described system and method provides a technique for determining that an incoming communication at a user device is being provided by a scamming entity, and thereafter, directing the call to an automated conversation agent present on the user device to interact with the scammer. The conversation agent present on the user device may utilize machine-learning models and natural language processing techniques to interact with a scammer without providing any personal information associated with a user, but communicating with the scammer in an attempt to waste a maximum amount of time. When interacting with the scammer on the active communication (e.g., phone call, instant message, text message, etc.), the system may occupy a scammer for an extended period of time resulting in the scammer making less calls over a period of time. If a conversation agent can maintain a scammer on the line for an above average amount of time, then the amount of calls in which a scammer can make over a period will decrease. Therefore, a system provides a technical improvement over traditional methods for interacting with a scamming entity on an active communication received at a user device.

The illustrated example embodiments will be best understood by reference to the figures. The following description is intended only by way of example, and simply illustrates certain example embodiments.

Figure 1:
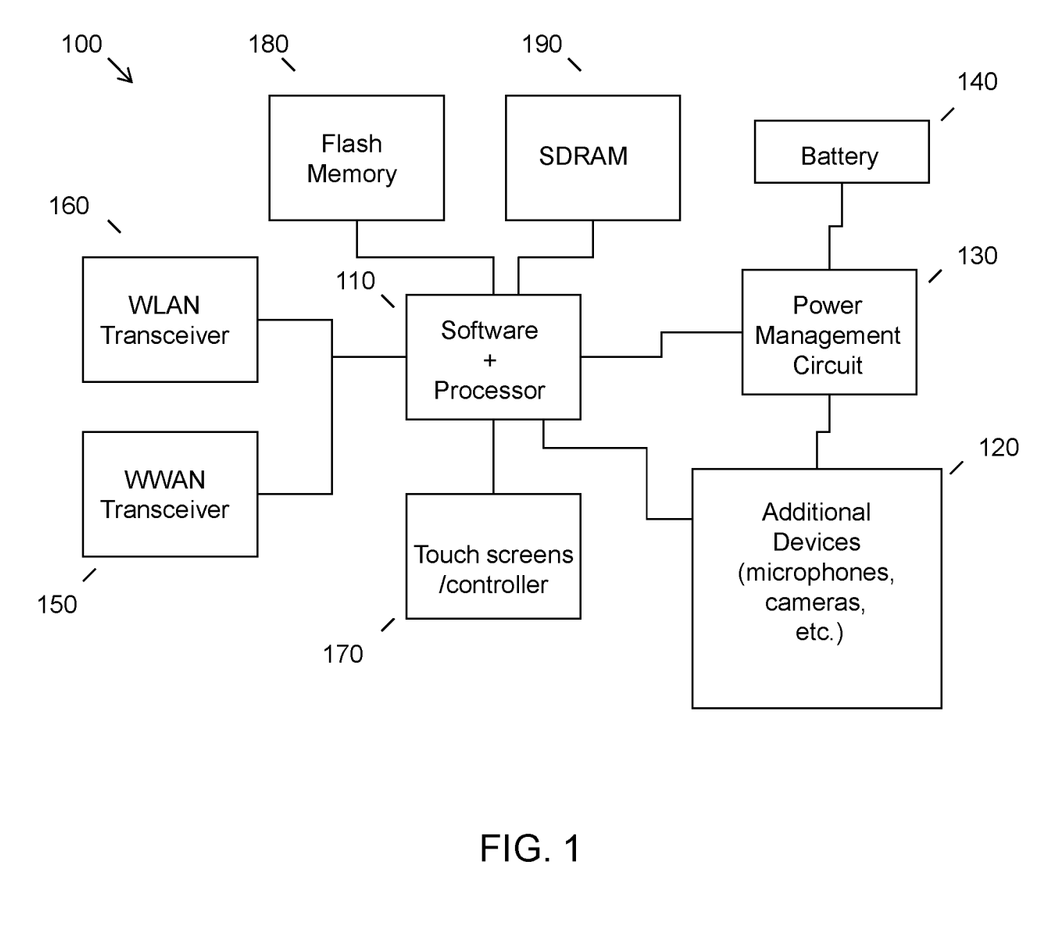
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
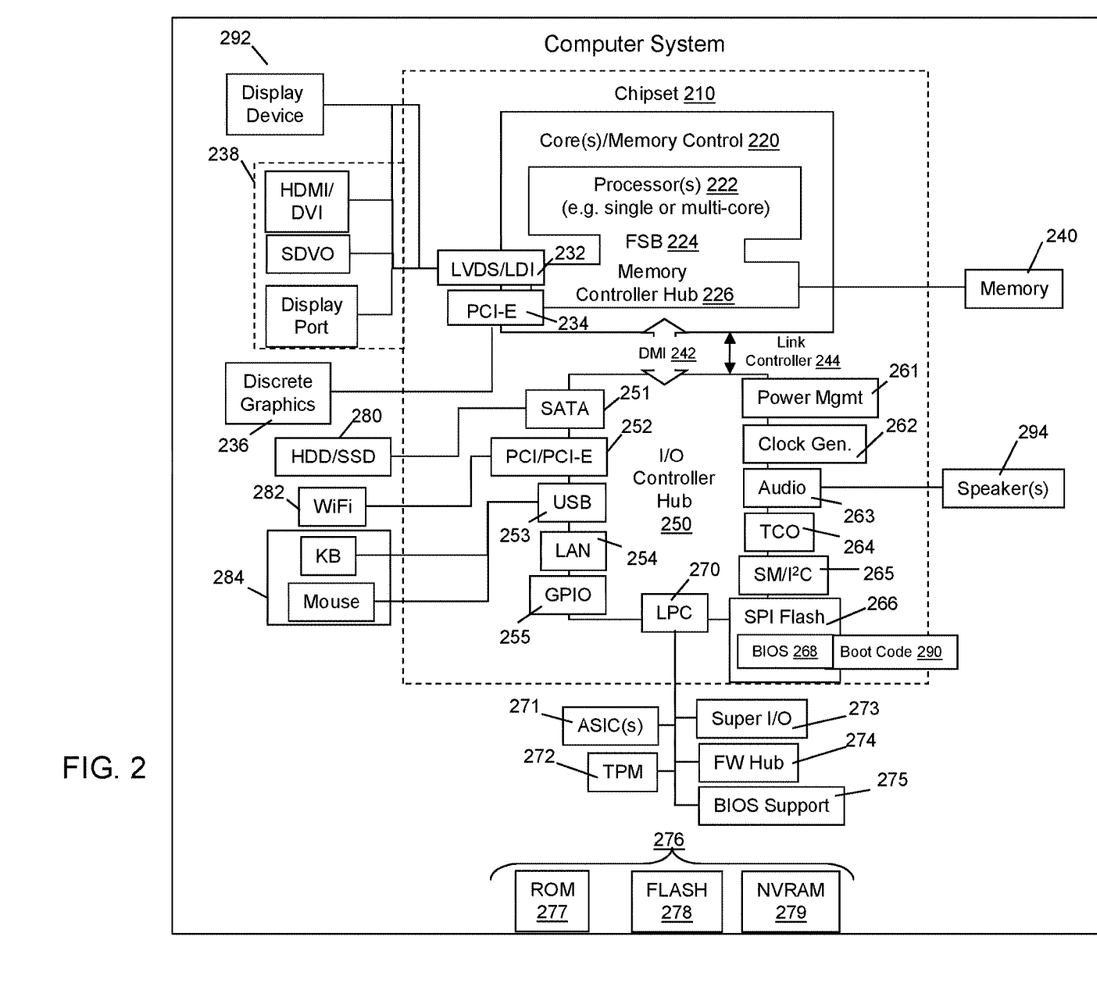
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in scam detection systems and/or conversation agent systems. For example, the circuitry outlined in FIG. 1 may be implemented in a tablet or smart phone embodiment, whereas the circuitry outlined in FIG. 2 may be implemented in a personal computer embodiment.

Figure 3:
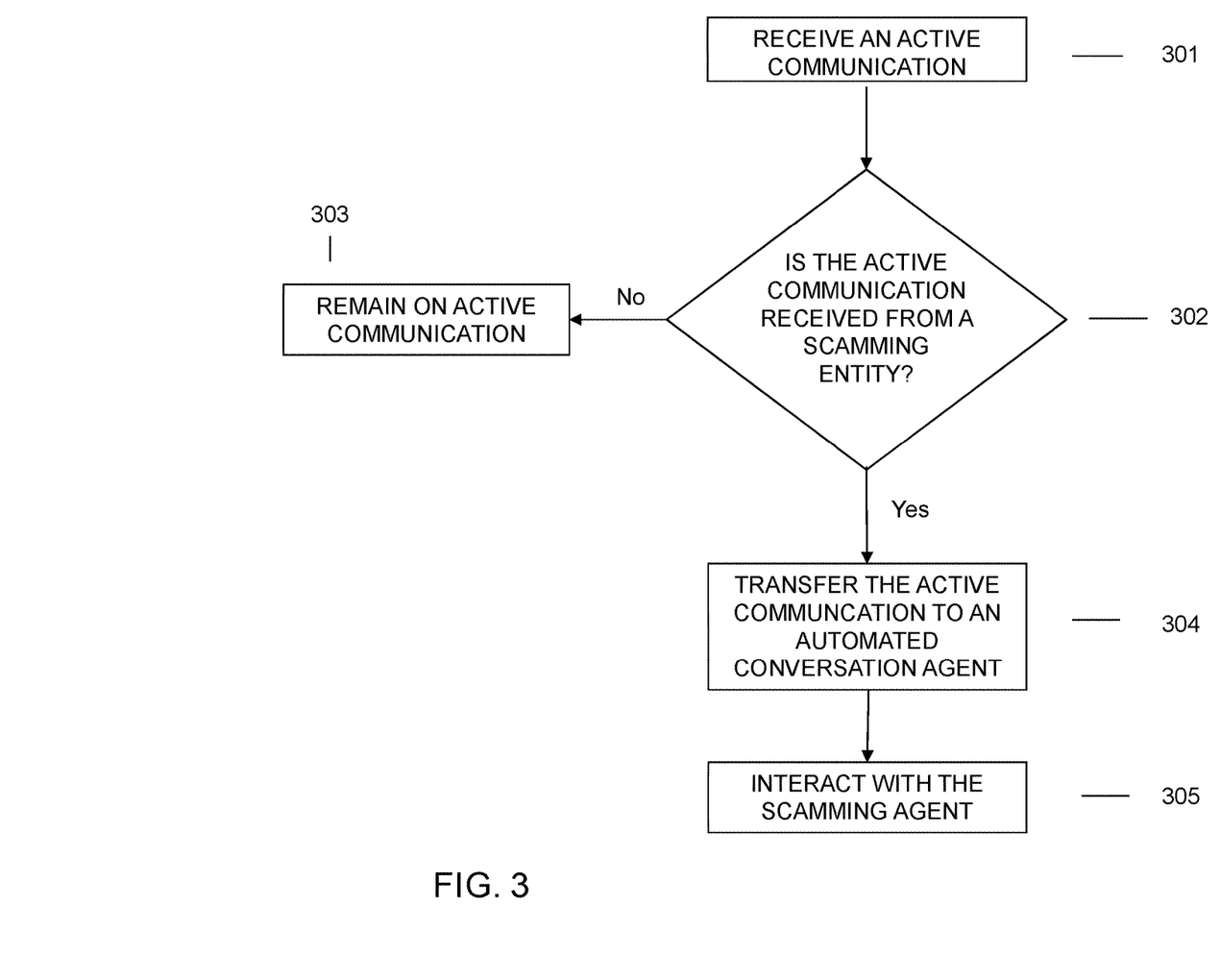
FIG. 3 illustrates an example method for determining whether an active communication is being received from a scamming entity and the system response.

FIG. 3 illustrates an example method for determining an active communication is received from a scamming entity and transferring the active communication to a conversation agent. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to interact with a scamming entity by use of the conversation agent attempting to waste a maximum amount of the scamming entity's time. Additionally, the scam detection system and automated conversation agent includes modules and features that are unique to the described system.

FIG. 3 illustrates an example method for determining whether an active communication is being received from a scamming entity and the system response. The method may be implemented on a system which includes a processor, a memory device, output devices (e.g., display devices, etc.), input devices (e.g., keyboard, touch screen, mouse, microphones, sensors, etc.), image capturing devices, and/or other components, for example, those discussed in connection with FIG. 1 and/or FIG. 2. While the system may include known hardware and software components and/or software components developed in the future, the system itself is specifically programmed to perform the functions as described herein to detect a scamming entity in an active communication and utilizing a bot to interact with the active communication at a device. Additionally, the system includes machine-learning models and natural language processing techniques that are unique to the described system.

At 301, the system may receive an active communication at a user device, also referred to as an information handling device, for example, a smart phone, tablet, smart watch, laptop, personal computer, digital assistant device, and/or the like. The receiving of the active communication may include the detection of an incoming communication at the user device. The active communication may be a phone call being received at the user device. Receipt of the communication may provide the system with an indication notifying that a user is attempting to be reached at the device. The indication provided to the user may be, for example, a device ringing or providing an audible output upon receiving a communication and/or a device providing haptic feedback (e.g., vibrating) upon receiving a communication.

Additionally or alternatively, receipt of the active communication may include receiving a text-based communication at a device and thereafter providing an indication notifying the user of the receipt of the text-based communication. For example, a user device may receive a notification indicating a received email at a user inbox accessible from a user device. The indications for notifying the user of text-based communications may be similar to those provided in receipt of a phone call, for example, upon receiving a text-based communication at a user device, the device may provide an audible indication (e.g., ringing, chime, etc.) and/or may provide haptic feedback (e.g., vibrating) describing the receipt of the text-based communication.

While the example of receiving a phone call at a smartphone to establish an active communication will be used here throughout, it should be understood that the described system can be applied to all communication types received at any type of user information handling device, for example, receiving a text-based communications at laptop, receiving a phone call through a digital assistant coupled to a user device, receiving a text-based communication at a smart phone, and the like.

Upon receiving the active communication, or phone call, at the user device, or the user's smart phone, the system, at 302, may determine if the communication is being received from a scamming entity. The system may utilize a scam detection system that may determine the entity that is reaching out to the user. Determination of the entity providing the active communication may influence the process the system uses to respond to the received active communication. In other words, the scam detection system may determine, at 302, whether the phone call being received from the entity at the user's device is being provided by a real human attempting to discuss a legitimate matter with the user or if the phone call is being provided by a scamming entity. Determining that the active communication being received at the user device is being provided by a real human attempting to discuss a legitimate matter may require a user to answer the phone call and have a discussion with the real human. As another example, determining the active communication is coming from a real person may require responding to a text-based communication in a timely manner.

Using the scam detection system, the system may determine that the entity attempting to reach the user is a scamming entity desiring discussion of an illegitimate topic. In other words, the scam detection system may determine that the entity contacting the user is attempting to scam the user. Accordingly, the system may also determine, at 302, that the active communication is received from a scamming entity. One technique for determining the active communication is received form a scamming entity may be based upon user input. A user may recognize upon receipt of the active communication that the entity is a scamming entity and provide user input labeling such an active communication as being received from a scamming entity.

For example, upon receiving a phone call from a scamming entity at a user smart phone, which the scam detection system does not recognize as a scamming entity, the user may provide input to the system, and more specifically the scam detection system utilized within the device, identifying the entity as a scamming entity. In an embodiment, the user may provide a specific key input during the active communication used as an identifier of the scamming entity, for example pressing "0" when determined to be an active communication from scammer. The system may then save the identifier associated with the determined scamming entity, and upon receipt of an active communication from the same entity in the future, the scam detection system may recognize the scammer without the need of user input.

The system may also automatically identify the active communication as being received from a scamming entity. In an embodiment, this determining, at 302, that may be based upon saved historical data recognizing a previous attempt from a scamming entity has been made in a similar fashion, for example, recognizing a phone number of the scamming entity. Additionally or alternatively, in an embodiment, the determining the active communication from a scamming entity is present may be determined by recognizing an email address, domain address, IP address, and the like, associated with the active communication. In other words, the system may compare received communication attributes to a database or other data storage location that includes attributes of entities that have been identified as scamming entities, or non-scamming entities. For example, the system may compare a telephone number or other identifier to a list that indicates whether the identifier belongs to a scamming entity or a safe or non-scamming entity.

The list or other data storage location may be local to a user device, stored on a network device, and/or the like. Additionally, the list or other data storage location may be populated not only using information from the local device, but also using information from other users, for example, the data storage location may be populated using a crowd-sourcing technique. The system may also utilize a machine-learning algorithm or other learning algorithm to correlate communication attributes to entity designations (e.g., scamming entity, non-scamming entity, etc.) and predict whether the active communication corresponds to a scamming entity.

If the system determines, at 302, that the active communication requires a response from the user, the system may remain on the active communication, at 303, until completion of the communication between the parties. Alternatively, the system may no longer monitor the communication between the parties.

However, when it is determined, at 302, that the active communication is being provided from a scamming entity, prior to providing a response to the active communication, the system may transfer the active communication to an automated conversation agent at 304. The automated conversation agent may employ a bot that will interact with an entity attempting to contact the user through the active communication being received at the user device. A bot is a software program that runs automated tasks created by user. Used in combination with the scam detection, the conversation agent containing a bot may be used when a scamming entity is determined to be attempting to contact the user, for example, to collect user data, convince the user to provide something of value to the scammer, and/or the like. The conversation agent used at 304 provide a level of security between the user device and the scamming entity, because the conversation agent and associated bot may communicate with the scamming entity instead of the user themselves, so the user is not scammed.

The automated conversation agent may employ machine-learning and natural language processing techniques that may be utilized when the conversation agent is communicating with the scammer. After transferring, at 302, the active communication to the conversation agent, the system may interact with the scamming entity using the automated conversation agent at 305. When interacting with the scamming entity at 305, the system's objective may be to maintain the scamming entity on the phone for a maximum amount of time. Being that the user is not interacting with the scamming entity, the conversation agent and employed bot may attempt to waste as much of the scammer's time as possible. In doing so, the conversation agent interacting with the scamming entity, at 305, may learn over time which responses provided by the conversation agent may maintain a scammer on an active communication while simultaneously not providing any personal user data to the scammers.

A scamming entity may routinely utilize a bot when reaching out to a user. As mentioned previously, a user may easily identify that a bot is being employed by the scamming entity, and upon input provided to the system identifying the entity as a scamming entity, the conversation agent, at 305, may take over communication for the user. Taking over the communication results in a bot employed by the scamming entity interacting with a bot associated with the conversation agent within the user device. At this point, a user is not burdened with trying to extend a conversation while not providing personal information, and the conversation agent may learn over time which questions and responses may result in the most time wasted for the scamming entity.

Additionally, or alternatively, the automated conversation agent utilizing a bot may provide input to the system in an attempt to access a human agent. It is common for companies that utilize a bot as a first level of communication and to have a human agent overseeing an active communication. The automated conversation agent may direct the active communication from two bots conversating to the bot of the automated conversation agent requesting communicating with a human agent. For example, in an embodiment, obtaining access to a human agent and bypassing the automated responses or bots employed by the scamming entity may require a simple input provided by the conversation agent, for example, pressing "1" when instructed. Additionally, or alternatively, the automated conversation agent may utilize machine-learning models and additional natural language processing techniques to provide responses and requests to the scamming entity present on the active communication until it is necessary for a human agent to intervene.

The conversation agent's ability over time may become more effective. Since a system utilizes one or more machine-learning techniques, the conversation and associated bot may determine which responses and requests result in a response, and specifically recording the responses and request that require lengthy responses on the scamming entities side. For example, as requests and responses are provided by the conversation agent, the system may record whether an answer was received and a length of answer. When the scamming entity determines that a person is not actually being communicated with, the scamming entity will likely end the communication. Accordingly, the scam detection system identifies which requests and responses result in answers and which ones result in communication endings and then can use machine-learning models and/or learning algorithms to make better requests and responses.

Thus, the scam detection system and thereafter a conversation agent employing a bot may interact with a determined scamming entity for a maximum amount of time. Such an interaction between the user's system and the scamming entity may assist in training the conversation agent, resulting in the automated conversation agent becoming more effective over time. Additionally, or alternatively, the system attempting to waste a maximum amount of the scamming entities time may result in the scamming entity making less scam calls since the scamming entity may be held up with interacting with the conversation for an above average amount of time.

Figure 4:
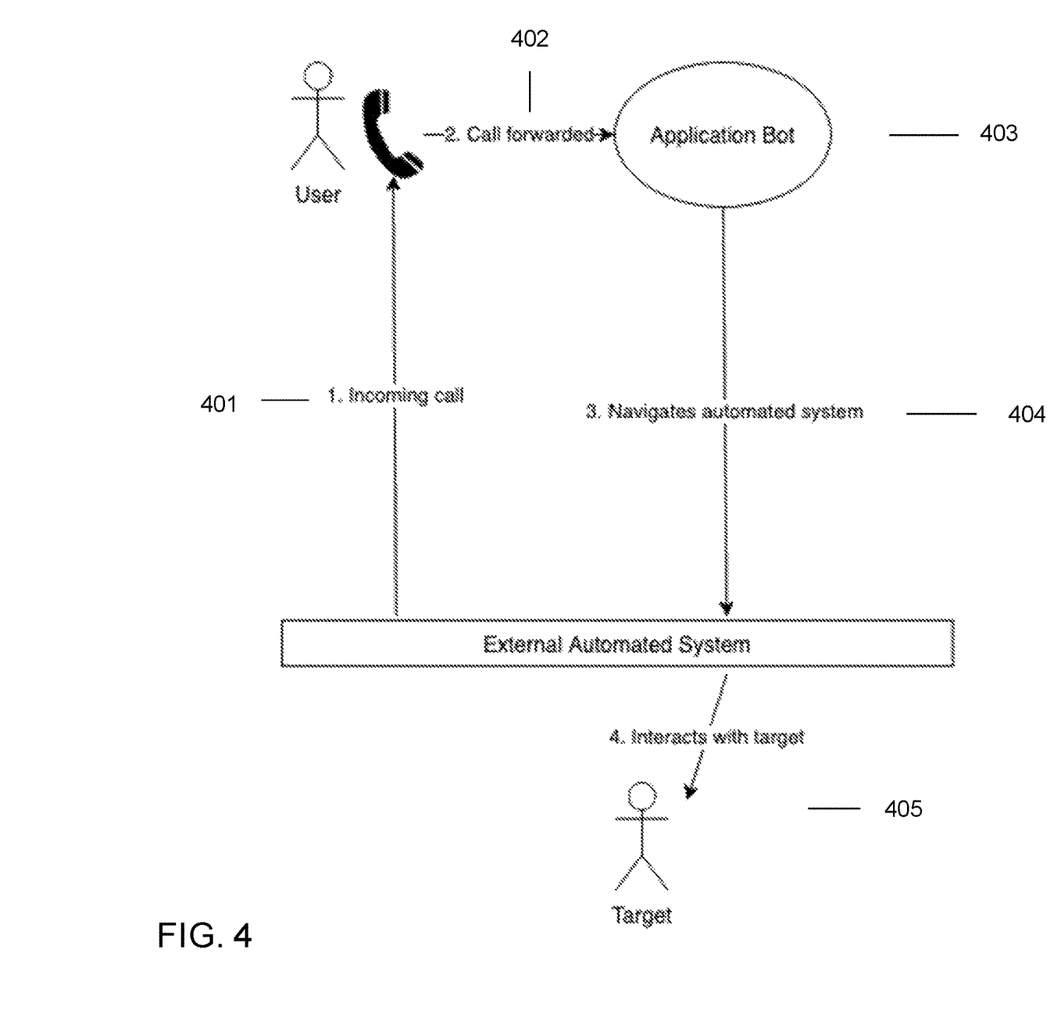
FIG. 4 illustrates an example system setup.

Referring now to FIG. 4, an example system setup containing the scam detection system and the conversation agent is present. In this example system setup, the system utilizes a smart phone as the user device and the active communication is a phone call received at the user's smartphone. As can be seen at 401, the system may receive an incoming call. Upon a user receiving an indication indicating that an incoming call is being received at the user's smartphone, the user may answer the incoming call. If the user and/or system automatically determines the communication is being received from a scamming entity, the call may be forwarded, or transferred, at 402, to the conversation agent, or application bot at 403. As mentioned previously, the system may require the user to answer the active communication, in this case the incoming phone call, determine the entity providing the call is a scamming entity, and provide input to the system that may then push the call to the conversation agent at 403.

It is important to remember that this method of pushing the call to the conversation agent does not always require the user to answer the call. For example, upon recognition of a scamming entity providing the incoming communication, the system may automatically push the call to the conversation agent, or application bot, at 403, before the user answers the communication. The automatic pushing of the communication to the conversation agent may be based upon the stored and referenced historical data associated with the recognized scamming entity. Thus, in this example, a user may not have to provide input identifying that the entity is a scamming entity. Additionally, or alternatively, the scam detection system may access crowdsourced and/or public information that identifies the entity as a scamming entity without the need of providing user identification input.

The application bot, or the conversation agent, at 403 may navigate the automated system, at 404, within a conversation with the scamming entity until a human agent associated with the scamming entity is accessed. As mentioned previously, accessing a human agent may require the application bot at 403 to audibly request communicating with a human agent, responding to requests of the scamming entity until the scamming entity determines a need for a human agent, a user inputting a request to communicate with a human agent, and/or the like. As the automated conversation agent navigates the automated system at 404, and is granted access to a human agent, the conversation agent may interact with the human agent associated with the scamming entity at 405. It is at this point that the automated conversation agent within the user device may further respond to a request from the scammer without providing personal data, and maximizing the amount of time the human agent is actively communicating with the conversation agent or the application bot, as is present at 403.

Figure 5:
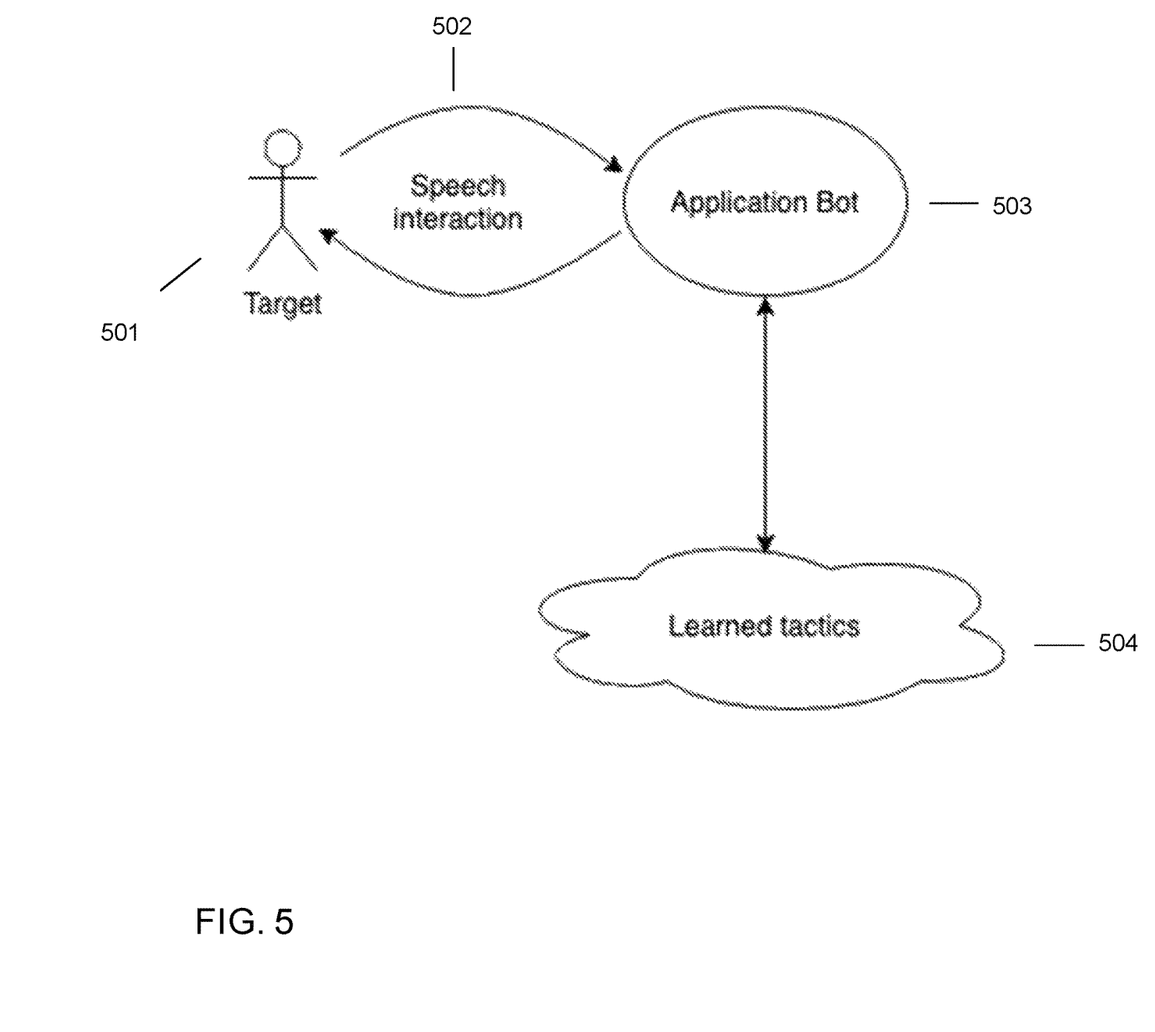
FIG. 5 illustrates an example method of the machine-learning and natural language processing techniques utilized by the conversation agent.

FIG. 5. illustrates an example method of the machine-learning and natural language processing techniques utilized by the conversation agent. The target of FIG. 5, at 501, corresponds to the human agent associated with the scamming entity. As mentioned previously, it is common practice of the system to attempt to gain access to a human agent after navigating through any automated conversations and/or bots present on the scamming entities side. Once reaching the point of 501, where the target, or human agent, is present on the active communication, in this example case a phone call, the target 501 may engage in speech interaction at 502 between the target 501 and the application bot, or conversation agent of the user device, at 503.

Within this speech interaction at 502, the application bot 503 may utilize learned tactics and/or historical information, as seen at 504, in order to maintain the speech interaction at 502. The speech interaction at 502 between the target 501 and the application bot 503 may utilize one or more natural language processing techniques. Implementation of at least one natural language processing technique may provide the conversation agent, or the application bot at 503, with a more fluid and clear automated response as compared to traditional automated responses that may be choppy and mechanical. Such natural language processing techniques may influence how long a human agent, or target at 501, may interact with the application bot 503. Such natural language processing techniques may analyze an output provided by the target 501, or the human agent associated with the scamming entity, and provide a responsive response to the output. This once again may influence the fluidity of a conversation between to the two sides of the phone call, attempting to make the conversation between the human agent, or target 501, and the application bot 503 more natural sounding.

The learned tactics at 504 may additionally provide the application bot 503 with a machine-learning model to attempt to extend the active communication with the scamming entity, or target 501. The machine-learning model may be updated with each interaction with a scamming entity. Each interaction with a scamming entity may vary slightly or may be completely different from a previously stored interaction. The machine-learning model may collect data associated with an interaction, as is present at 502, to be accessed when a new interaction with a scamming entity and/or human agent is occurring. The machine-learning model may utilize the data associated with one or more previously saved interactions and apply the learned tactics to the current speech interaction.

Additionally, the strategy in which the machine-learning model utilizes a specific type of interaction may vary between scamming entity types. One strategy of extending a conversation for a scamming entity may not be as successful for a separate scamming entity. However, the machine-learning model and techniques used may be more scamming-entity specific as the model learns additional strategies over time. Utilizing the machine-learning model may allow the system to regularly employ a strategy as a delaying technique. Being that the desired end goal is utilizing a conversation agent to maximize the amount of time in which a scamming entity will stay on an active communication, a delaying technique may be utilized in each strategy when communicating with a scamming entity, or target at 501.

The machine-learning model may be trained over time based upon a plurality of interactions between the system and a plurality of scamming entities. The model can utilize predictions and decisions as feedback to refine the model and make it more accurate. The model ingests the predictions and decisions made by the model and any other feedback given to the model, either through actions of the model or by a user, to automatically retrain itself. This training may then permit more fluid conversation between the conversation and the scamming entity; therefore, maximizing an amount of time the scamming entity remains on the active communication.

The various embodiments described herein thus represent a technical improvement to conventional methods for identifying a scamming entity during an active communication present at a user device. Rather than using traditional methods of answering a scam call or ignoring a scammer, the described system and method utilizes a scam detection system to determine an identity of an entity attempting to reach a user, and thereafter utilizes a conversation agent containing a bot to interact with the determined scamming entity. The system is able to use one or more techniques for interacting with a scamming entity by use of the automated conversation agent employing natural language processing techniques and machine-learning models that may maximize an amount of time a scamming entity is present on an active communication while simultaneously not providing personal information from the automated conversation agent to the scamming entity. Additionally, since the system attempts to elongate the conversation with the scamming entity, increasing an average amount of time per each call made by the scamming entity will therefore reduce the total amount of calls in which a scamming entity may make over a period of time. Such embodiments may allow a system to quickly recognize the presence of a scamming entity and transfer the active communication of the scammer to the automated conversation agent with minimal interruption to a user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at an information handling device, an active communication;
determining, using a scam detection system, the active communication is received from a scamming entity;
transferring, using the scam detection system, the active communication to an automated conversation agent; and
interacting, using the automated conversation agent, with the scamming entity, wherein the interacting comprises identifying and employing, utilizing a machine-learning model, at least one strategy for extending the active communication with the scamming entity for a maximum amount of time, wherein the machine-learning model learns questions and responses resulting in the extending of the active communication for the maximum amount of time.

2. The method of claim 1, wherein the interacting comprises the automated conversation agent providing input to the scamming entity to access a human agent.

3. The method of claim 1, wherein the interacting comprises interacting with a human agent of the scamming entity utilizing at least one natural language processing technique.

4. The method of claim 3, wherein the natural language processing technique comprises analyzing an output provided by the scamming entity and providing a responsive response to the output.

5. The method of claim 1, comprising updating the machine-learning model based upon interactions with scamming entities.

6. The method of claim 1, wherein the at least one strategy comprises a delaying technique.

7. The method of claim 1, further comprising identifying an identifier corresponding to the active communication and marking the identifier as corresponding to a scamming entity.

8. The method of claim 1, wherein the determining comprises identifying an identifier corresponding to the active communication is identified as belonging to a scamming entity.

9. The method of claim 1, wherein the determining is based upon user input.

10. An information handling device, the information handling device comprising:
a processor;
a memory device that stores instructions that, when executed by the processor, causes the information handling device to:
receive, at an information handling device, an active communication;
determine, using a scam detection system, the active communication is received from a scamming entity;
transfer, using the scam detection system, the active communication to an automated conversation agent; and
interact, using the automated conversation agent, with the scamming entity, wherein the interacting comprises identifying and employing, utilizing a machine-learning model, at least one strategy for extending the active communication with the scamming entity for a maximum amount of time, wherein the machine-learning model learns which questions and responses result in the extending of the active communication for the maximum amount of time.

11. The information handling device of claim 10, wherein the interacting comprises the automated conversation agent providing input to the scamming entity utilizing at least one natural language processing technique.

12. The information handling device of claim 10, wherein the interacting comprises interacting with a human agent of the scamming entity utilizing at least one natural language processing technique.

13. The information handling device of claim 12, wherein the natural language processing technique comprises analyzing an output provided by the scamming entity and providing a responsive response to the output.

14. The information handling device of claim 10, comprising updating the machine-learning model based upon interactions with the scamming entities.

15. The information handling device of claim 10, wherein the at least one strategy comprises a delaying technique.

16. The information handling device of claim 10, further comprising identifying an identifier corresponding to the active communication and marking the identifier as corresponding to a scamming entity.

17. The information handling device of claim 10, wherein the determining comprises identifying an identifier corresponding to the active communication is identified as belonging to a scamming entity.

18. A product, the product comprising:
a computer-readable storage device that stores executable code that, when executed by a processor, causes the product to:
receive, at an information handling device, an active communication;
determine, using a scam detection system, the active communication is received from a scamming entity;
transfer, using the detection system, the active communication to an automated conversation agent; and
interact, using the automated conversation agent, with the scamming entity, wherein the interacting comprises identifying and employing, utilizing a machine-learning model, at least one strategy for extending the active communication with the scamming entity for a maximum amount of time, wherein the machine-learning model learns which questions and responses result in the extending of the active communication for the maximum amount of time.

* * * * *